(12) United States Patent
Yoo

(10) Patent No.: US 7,100,561 B2
(45) Date of Patent: Sep. 5, 2006

(54) COVER FOR JOINT PART BETWEEN ENGINE AND TRANSMISSION

(75) Inventor: Sung-Yuel Yoo, Gyeonggi-do (KR)

(73) Assignees: Hyundai Motor Company, (KR); Kia Motors Corporation, (KR)

(*) Notice: Subject to any disclaimer, the term of this patent is extended or adjusted under 35 U.S.C. 154(b) by 0 days.

(21) Appl. No.: 10/985,864

(22) Filed: Nov. 10, 2004

(65) Prior Publication Data

US 2005/0115357 A1   Jun. 2, 2005

(30) Foreign Application Priority Data

Nov. 11, 2003   (KR)  ............. 10-2003-0079367

(51) Int. Cl.
*F02F 7/00* (2006.01)
*F16H 57/02* (2006.01)

(52) U.S. Cl. ................. 123/195 C; 123/196 R; 74/606 R

(58) Field of Classification Search ........... 123/195 R, 123/195 C, 196 R, 198 E, 195 A; 184/6.5; 192/3.54, 3.57, 3.62, 3.63; 74/606 R
See application file for complete search history.

(56) References Cited

U.S. PATENT DOCUMENTS

| | | | |
|---|---|---|---|
| 4,669,588 A * | 6/1987 | Hayashi et al. | ............ 192/3.57 |
| 6,871,627 B1 * | 3/2005 | Fujikubo | ............... 123/196 R |
| 2004/0104074 A1 * | 6/2004 | Nakai et al. | ................. 184/6.5 |

FOREIGN PATENT DOCUMENTS

JP   59096414 A *   6/1984   ............ 123/196 R

* cited by examiner

*Primary Examiner*—Willis R. Wolfe, Jr.
(74) *Attorney, Agent, or Firm*—Peter F. Coreless; Edwards Angell Palmer Dodge, LLP

(57) ABSTRACT

A cover of a joint part between an engine and transmission is provided. Preferred cover systems of the invention include a transmission-side vertical wall for closing a tool insertion space; and an oil pan mounting part at an opposing side of the transmission-side vertical wall that fits with the transmission-side of an engine oil pan. Preferred cover systems of the invention can at least substantially preclude exterior impurities from entering into the transmission and effectively insulate noise and vibration of the transmission from being transmitted to the exterior or the engine.

13 Claims, 4 Drawing Sheets

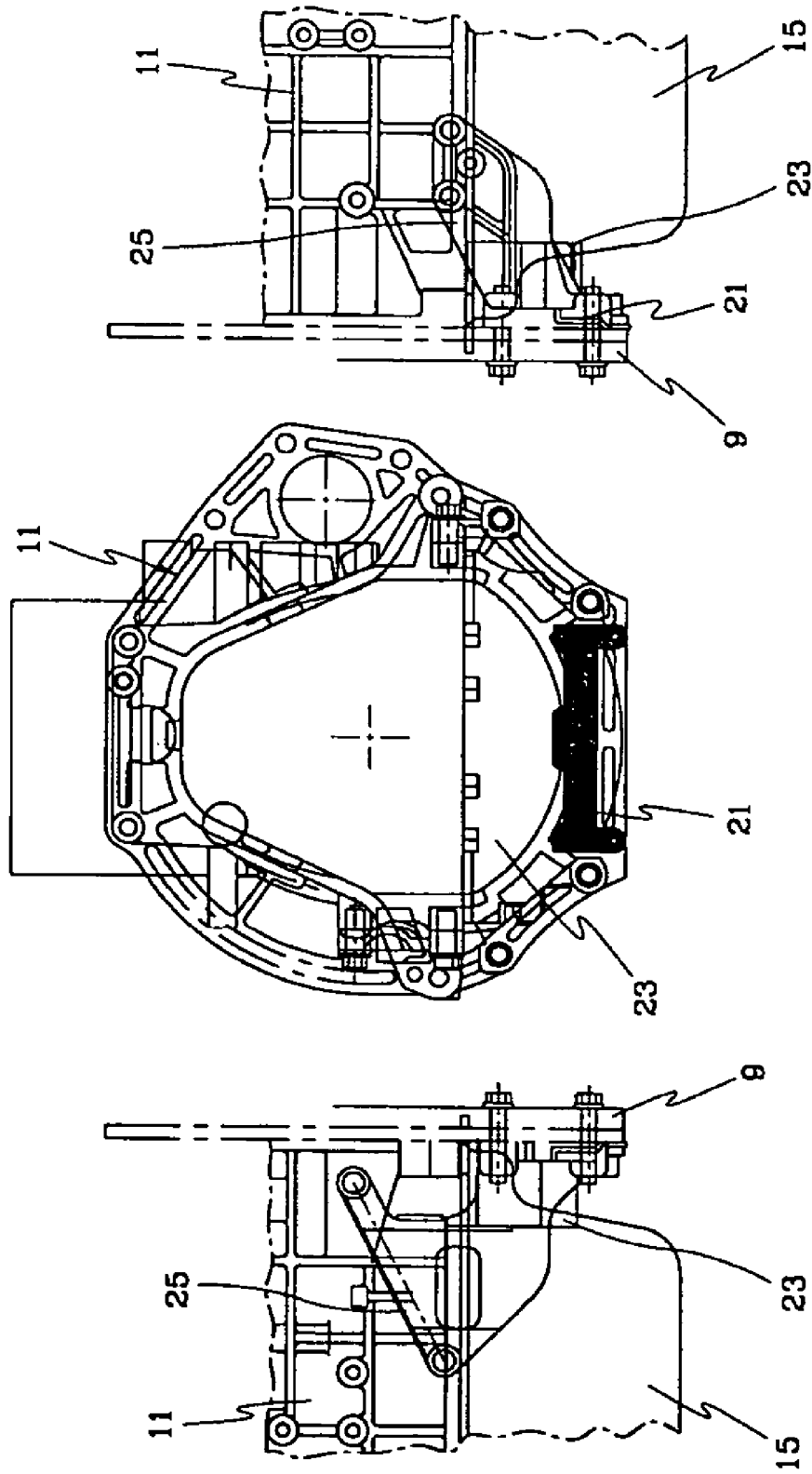

COVER FOR JOINT PART BETWEEN ENGINE AND TRANSMISSION

CROSS-REFERENCE TO RELATED APPLICATIONS

The present application is based on, and claims priority from, Korean Application Serial Number 10-2003-0079367, filed on Nov. 11, 2003, the disclosure of which is hereby incorporated by reference herein in its entirety.

FIELD OF THE INVENTION

In one aspect, the present invention relates to a cover of a joint part between an engine and transmission. In a more particular aspect, the present invention relates to a cover that seals or closes a tool insertion space formed to connect a drive plate, attached to a flywheel of the engine, and a torque-converter of the transmission.

BACKGROUND OF THE INVENTION

A flywheel located on the rear of an engine such as used in automobiles typically couples with a drive plate attached to a torque-converter to transmit engine power to the transmission.

However, in order to couple the drive plate and torque-converter, a space is required to insert a tool used to couple the drive plate and torque-converter between the transmission case and engine.

That space for inserting a tool however can be problematic. For example, the tool insertion space can provide access for impurities to enter the transmission as well as for noise and vibrations from the transmission to be communicated outwardly from the engine.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

Preferred systems of the present invention can close a tool insertion space (formed to couple an engine and associated transmission) and thereby can at least substantially prevent exterior impurities from entering into a transmission and can effectively insulate noise and vibration of the transmission from being transmitted to the exterior or the engine.

More particularly, a cover is provided for the joint part between an engine and transmission and which preferably includes a transmission-side vertical wall that can close a tool insertion space by contacting the engine-side of a transmission case provided with the tool insertion space. An oil pan mounting part is preferably formed or positioned at an opposing side of the transmission-side vertical wall to fit the transmission-side of an engine oil pan.

The invention also includes engine systems and motor vehicles that comprise the disclosed covers. In certain aspects, automobiles and automobile engines that comprises the disclosed covers are provided. Such engine systems of the invention generally comprise an associated transmission.

It is understood that the term "vehicle" or other similar term as used herein is inclusive of motor vehicles in general such as passenger automobiles, buses, trucks, various commercial vehicles, watercraft, aircraft, and the like.

Other aspects of the invention are discussed below.

BRIEF DESCRIPTION OF THE DRAWINGS

For a better understanding of the nature and objects of the present invention, reference should be made to the following detailed description taken in conjunction with the accompanying drawings, in which:

FIG. 5 illustrates a third-angle projection of a cover installed at the joint part between the engine and transmission according to an embodiment of the present invention.

DETAILED DESCRIPTION OF THE INVENTION

As discussed above, in a preferred aspects of the invention, a cover is provided for use in an engine having a transmission, the cover comprising a transmission-side vertical wall for closing a tool insertion space; and an oil pan mounting part at an opposing side of the transmission-side vertical wall that fits with the transmission-side of an engine oil pan. Suitably the vertical wall contacts an engine side of a transmission case associated with the tool insertion space. Preferably, the cover system further comprises a mounting bracket suitably positioned proximate to the transmission-side vertical wall. The mounting bracket preferably comprises attachment apparatus (e.g. bolt holes, screw holes, clip attachments, and the like) to install the cover to the transmission case. Preferably, the transmission-side vertical wall and the oil pan mounting part are integrally molded. It is also preferred that the mounting bracket is positioned between the transmission-side vertical wall and the oil pan mounting part.

One or more preferred embodiments of the present invention will now be described in detail with reference to the attached drawings.

Figure 1:
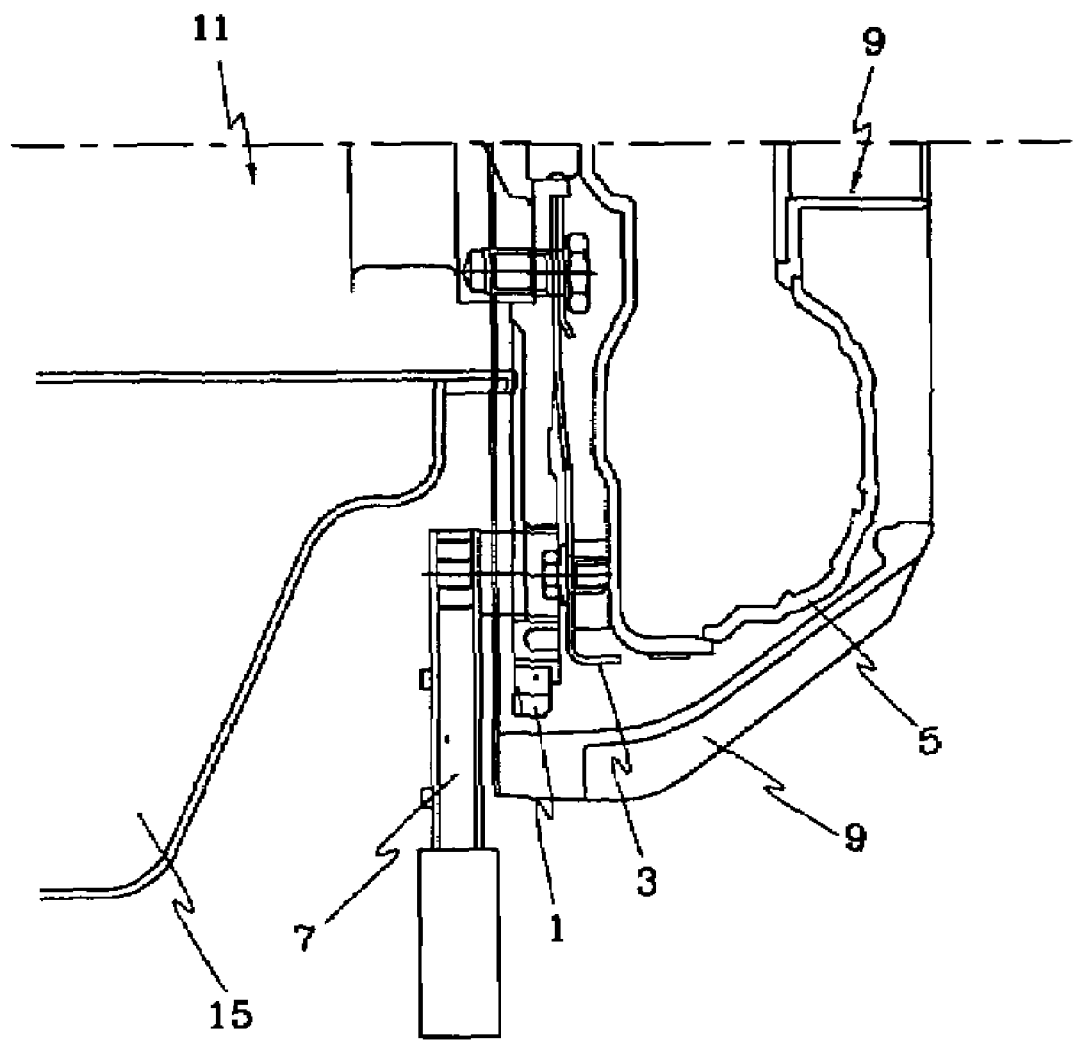
FIG. 1 illustrates a joint part of the engine and transmission before installing a cover therebetween according to an embodiment of the present invention.

Referring to FIG. 1, an engine flywheel 1 couples with a drive plate 3, that couples with a torque-converter 5 via a coupling bolt. However, in order for the drive plate 3 to be bolted to the torque-converter 5, a tool 7 (e.g., a box wrench or the like) should be inserted as generally shown in FIG. 1. A space for inserting the tool 7 is suitably provided at the engine-side 11 of a transmission case 9.

Figure 2:
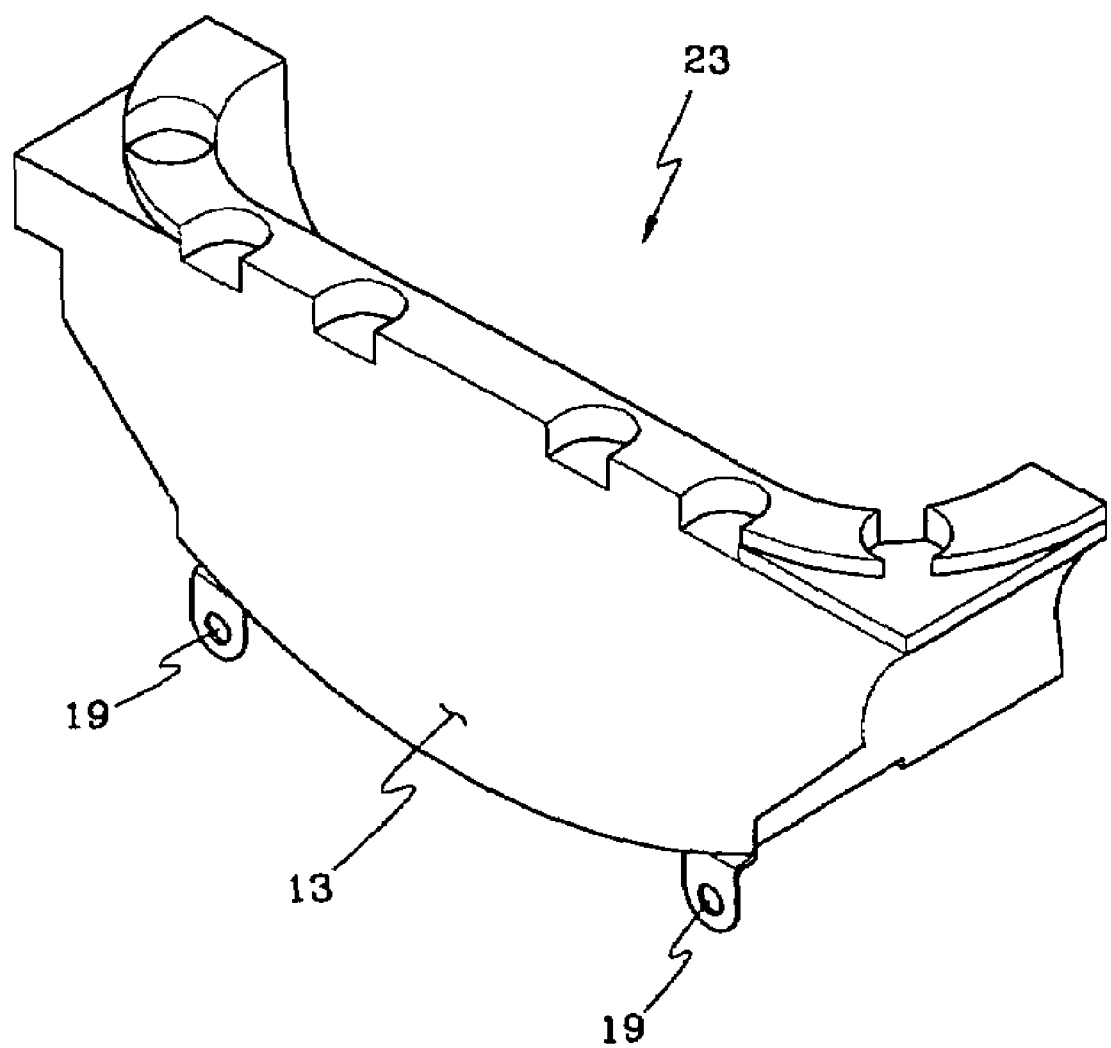
FIG. 2 is a perspective view of a cover of the joint part between the engine and transmission illustrating a transmission-side of the cover according to an embodiment of the present invention.
Figure 3:
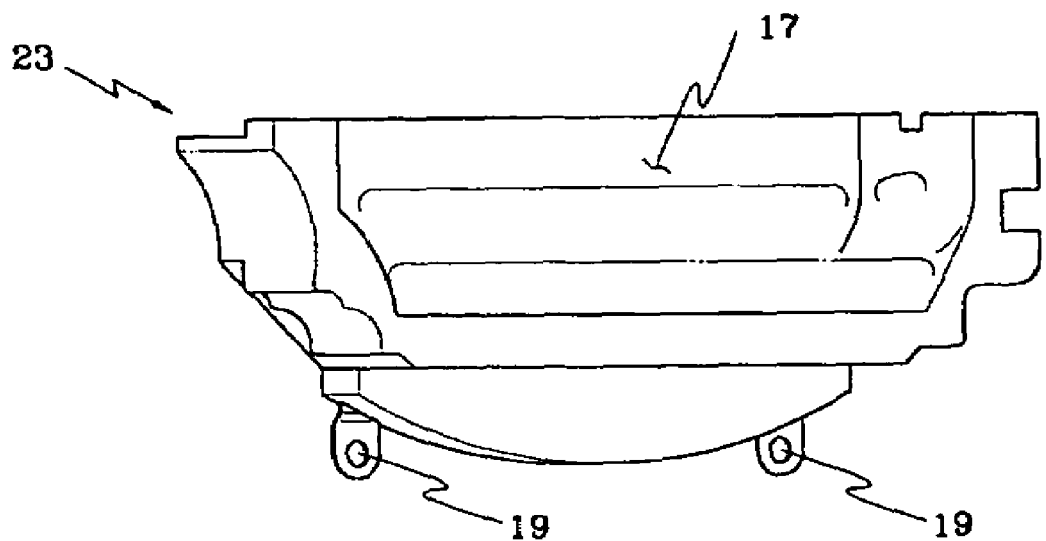
FIG. 3 illustrates an engine oil pan-side of a cover according to an embodiment of the present invention.
Figure 4:
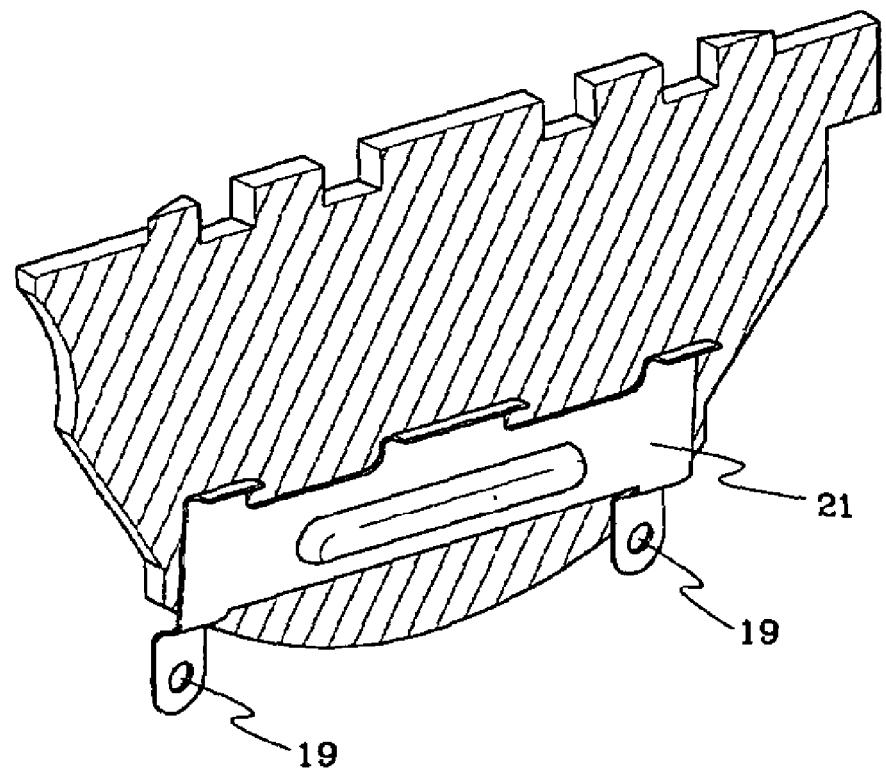
FIG. 4 is a cross-sectional view of a cover at the transmission-side thereof with a mounting bracket attached thereon.

Referring next to FIGS. 2 and 3, a cover 23 for the joint part between the engine and transmission suitably includes a transmission-side vertical wall 13 for closing a tool insertion space by contacting the engine-side of the transmission case 9 provided with the tool insertion space. An oil pan mounting part 17 is suitably formed on an opposite side of the transmission-side vertical wall 13 to fit the transmission-side of an engine oil pan 15. A mounting bracket 21 suitably is integrally equipped in close proximity of the transmission-side vertical wall 13 and provides bolt holes 19 or other attachment apparatus to install the cover 23 onto the transmission case 9.

The transmission-side vertical wall 13 and oil pan mounting part 17 preferably are integrally molded, whereas the mounting bracket 21, a metallic member, is inserted between the transmission-side vertical wall 13 and oil pan mounting part 17 during the molding process.

The transmission-side vertical wall 13 and oil pan mounting part 17 are preferably molded with urethane and/or any of a variety of one or more plastic materials to reduce their weight and insulate vibration and noise.

With reference to FIG. 5, the cover 23 is mounted to the transmission case 9 via bolts through the bolt holes 19 of the mounting bracket 21. A stay 25 is suitably installed at both sides of the transmission and engine to firmly couple the transmission case 9 and engine 11.

Once the cover 23 is installed, the engine-side of the transmission case 9 is closed via the transmission-side vertical wall 13. Thus, impurities may be at least substantially prevented from entering into the transmission case 9, and noise and vibration are insulated from being transmitted from the transmission case 9 to the exterior.

As discussed above, the cover 23 preferably principally composed of urethane and/or one or more their plastic materials may absorb noise and vibration, thereby preventing noise and vibration from being conveyed to the engine and exterior.

The general design of the integral-cover 23 also can facilitate the handling thereof, and the space for the joint part between the engine 11 and transmission case 9 can easily be closed via the cover 23 in a simple assembly, contributing to an improvement of the assembly operation of the engine 11 and transmission case 9.

As apparent from the foregoing, there is an advantage in that a tool insertion space for coupling the engine and transmission is sealed or closed under a simple construction and operation, thereby at least substantially preventing exterior impurities from entering into the transmission and effectively insulating noise and vibration of the transmission from passing on the exterior or engine.

While the invention has been described with reference to specific embodiments, modifications and variations of the invention may be constructed with departing from the scope of the invention, which is defined in the following claims.

What is claimed is:

1. A cover for use in an engine having a transmission, the cover comprising:
    a transmission-side vertical wall for closing a tool insertion space;
    an oil pan mounting part at an opposing side of the transmission-side vertical wall that fits with the transmission-side of an engine oil pan; and
    a mounting bracket proximate to the transmission-side vertical wall.

2. The cover of claim 1 wherein the vertical wall contacts an engine side of a transmission case associated with the tool insertion space.

3. The cover of claim 1 wherein the mounting bracket comprises attachment apparatus to install the cover to the transmission case.

4. The cover of claim 1 wherein the transmission-side vertical wall and said oil pan mounting part are integrally molded.

5. The cover of claim 4 wherein the mounting bracket is positioned between the transmission-side vertical wall and the oil pan mounting part.

6. An engine having a transmission comprising a cover,
    the cover comprising (a) a transmission-side vertical wall for closing a tool insertion space; and (b) an oil pan mounting part at an opposing side of the transmission-side vertical wall that fits with the transmission-side of an engine oil pan; and (c) a mounting bracket positioned proximate to the transmission-side vertical wall.

7. The engine of claim 6 wherein the mounting bracket comprises attachment apparatus to install the cover to the transmission case.

8. The engine of claim 6 wherein the transmission-side vertical wall and the oil pan mounting part are integrally molded.

9. The engine of claim 8 wherein the mounting bracket is a metallic member positioned between the transmission-side vertical wall and the oil pan mounting part.

10. A motor vehicle comprising:
    a cover comprising (a) a transmission-side vertical wall for closing a tool insertion space; (b) an oil pan mounting part formed at an opposite side of said transmission-side vertical wall to fit the transmission-side of an engine oil pan; and (c) a mounting bracket positioned proximate to the transmission-side vertical wall.

11. The motor vehicle of claim 10 wherein the mounting bracket comprises attachment apparatus to install the cover to the transmission case.

12. The motor vehicle of claim 10 wherein the transmission-side vertical wall and the oil pan mounting part are integrally molded.

13. The motor vehicle of claim 12 wherein the mounting bracket is a metallic member positioned between the transmission-side vertical wall and the oil pan mounting part.

* * * * *